(12) United States Patent
Schmoening et al.

(10) Patent No.: US 10,791,673 B2
(45) Date of Patent: Oct. 6, 2020

(54) DRIVE SYSTEM HAVING HYDRAULIC POWER TRANSMISSION FOR A HARVESTING HEADER OF A HARVESTER

(71) Applicant: Deere & Company, Moline, IL (US)

(72) Inventors: Christoph Schmoening, Haltern (DE); Stefan Bohrer, St. Wendel (DE)

(73) Assignee: DEERE & COMPANY, Moline, IL (US)

( * ) Notice: Subject to any disclaimer, the term of this patent is extended or adjusted under 35 U.S.C. 154(b) by 257 days.

(21) Appl. No.: 15/886,301

(22) Filed: Feb. 1, 2018

(65) Prior Publication Data

US 2018/0213721 A1    Aug. 2, 2018

(30) Foreign Application Priority Data

Feb. 2, 2017  (DE) .................. 10 2017 201 701

(51) Int. Cl.
| | | |
|---|---|---|
| A01D 41/14 | (2006.01) | |
| A01B 59/06 | (2006.01) | |
| A01D 69/03 | (2006.01) | |
| A01D 89/00 | (2006.01) | |
| A01D 41/127 | (2006.01) | |
| A01F 29/14 | (2006.01) | |

(52) U.S. Cl.
CPC .......... *A01D 41/142* (2013.01); *A01B 59/064* (2013.01); *A01D 41/1274* (2013.01); *A01D 69/03* (2013.01); *A01D 89/005* (2013.01); *A01F 29/14* (2013.01)

(58) Field of Classification Search
CPC ..... A01B 59/064; A01F 29/14; A01D 41/142; A01D 41/06; A01D 41/1274; A01D 57/025; A01D 57/28; A01D 34/64; A01D 34/6806; A01D 69/03; A01D 69/005; A01D 89/005; A01D 84/00; A01D 84/02
See application file for complete search history.

(56) References Cited

U.S. PATENT DOCUMENTS 4,009,556 A * 3/1977 Molzahn ................ A01D 69/00
 56/10.7
5,768,868 A * 6/1998 Stein ..................... A01D 41/142
 56/14.5

(Continued)

FOREIGN PATENT DOCUMENTS

DE        19918550 A1   10/2000
DE    102010028605 A1   11/2011
(Continued)

OTHER PUBLICATIONS

European Search Report issued in counterpart application No. 18152946.2 dated Jul. 25, 2018. (7 pages).

*Primary Examiner* — Robert E Pezzuto
*Assistant Examiner* — Adam J Behrens

(57) ABSTRACT

A drive system for a harvesting header of a harvester includes a drive motor, and a drive train connected between the drive motor and one or more driven elements of the harvesting header. The drive train has a variable-displacement hydraulic pump arranged on board the harvester and a hydraulic motor connected in a closed circuit to the hydraulic pump. The hydraulic motor is mounted on the harvesting header and detachably connected by hydraulic coupling connections to the hydraulic pump.

13 Claims, 2 Drawing Sheets

(56) References Cited

U.S. PATENT DOCUMENTS

| | | | | |
|---|---|---|---|---|
| 5,996,324 | A * | 12/1999 | Oligmueller | A01D 69/00 56/11.2 |
| 6,397,571 | B1 * | 6/2002 | Ehrecke | A01D 41/127 460/1 |
| 6,519,923 | B1 * | 2/2003 | Cooksey | A01B 71/08 56/14.9 |
| 7,748,489 | B2 | 7/2010 | Sheidler et al. | |
| 9,717,179 | B2 * | 8/2017 | Trowbridge | F16H 61/4139 |
| 9,723,785 | B2 * | 8/2017 | Ritter | A01D 41/06 |
| 2003/0172637 | A1 * | 9/2003 | Watts | A01B 71/06 56/14.7 |
| 2005/0279070 | A1 * | 12/2005 | Pirro | A01D 41/1274 56/14.6 |
| 2006/0042217 | A1 * | 3/2006 | Buermann | A01D 41/142 56/257 |
| 2008/0271425 | A1 * | 11/2008 | Ricketts | A01D 41/16 56/15.6 |
| 2010/0023222 | A1 | 1/2010 | Chiocco | |

FOREIGN PATENT DOCUMENTS

| | | | |
|---|---|---|---|
| DE | 102013214986 A1 | 2/2015 | |
| DE | 102017214097 A1 | 7/2018 | |
| EP | 1055359 A1 | 11/2000 | |
| EP | 1133912 * | 9/2001 | A01D 89/00 |
| EP | 1133912 A1 | 9/2001 | |
| EP | 1346625 A1 | 9/2003 | |
| EP | 1932417 A1 | 6/2008 | |
| EP | 2018981 A1 | 1/2009 | |
| WO | 02056672 A1 | 7/2002 | |

* cited by examiner

DRIVE SYSTEM HAVING HYDRAULIC POWER TRANSMISSION FOR A HARVESTING HEADER OF A HARVESTER

RELATED APPLICATIONS

This application claims priority to German Application Ser. No. 102017201701.5, filed Feb. 2, 2017, the disclosure of which is hereby expressly incorporated by reference in its entirety.

FIELD OF THE DISCLOSURE

The present disclosure relates to a drive system for a harvesting header of a harvester, the harvesting header having a drive motor and a drive train connected between the drive motor and one or more driven elements of the harvesting header, the drive train having a variable-displacement hydraulic pump arranged on board the harvester and a hydraulic motor connected in a closed circuit to the hydraulic pump, and further relates to a corresponding harvester having a harvesting header.

BACKGROUND

Self-propelled harvesters are usually equipped with removable harvesting headers, which can be removed for road transport from an intake channel mounted on the front side of the harvester, and can be interchanged with a different harvesting header for harvesting different types of grain if necessary. The drive unit for the harvesting header is usually operated by the harvester and can provide a purely mechanical drive train between the drive engine of the harvester and the harvesting header, or the harvesting header is driven by means of a hydraulic motor, to which a hydraulic fluid under pressure is applied by means of a hydraulic pump operated by the drive engine of the harvester.

The drive unit of the hydraulic motor for driving movable elements of the harvesting header is typically arranged on board the harvester and is operated by a variable-displacement pump in a closed hydraulic circuit (see, for example, WO 02/056672 A1). The drive torque is transmitted by means of jointed shafts which must be attached manually when attaching the harvesting header, or via couplings (see, for example, DE 10 2010 028 605 A1), which automatically close when the harvesting header is attached. It has also been proposed to transmit the drive power from the harvester to the harvesting header mechanically by articulated shafts and to convert it to there by means of a pump into hydraulic drive power that is used for driving a pump (e.g., EP 1 055 359 A1), or to provide a hydraulic pump on board the harvester which is connected in an open circuit to a hydraulic motor on the harvesting header (e.g., DE 199 18 550 A1).

The post-published document DE 10 2017 200 330 A1 describes a harvesting header drive unit in a closed hydraulic circuit having a hydraulic motor located onboard the harvesting header, but does not mention a detachable hydraulic coupling connection between the harvesting header and the harvester.

A closed hydraulic circuit for driving the harvesting header has the advantage that the transmittable drive power can be greater than for an open hydraulic circuit. Such closed hydraulic circuits have until now always been provided entirely onboard the harvester and the drive power of the hydraulic motor has been transmitted by a detachable mechanical drive train to the harvesting header, or the drive power transmitted mechanically to the harvesting header is transmitted by a closed hydraulic circuit arranged exclusively on board the harvester. Hydraulic drive energy has also been transmitted by the harvester to the harvesting header, but only in an open hydraulic circuit, which can only transfer limited hydraulic power.

There is a need for a drive system for a harvesting header of a harvester, and a corresponding harvester having a harvesting header that does not require a mechanical drive connection between the harvester and the harvesting header, but which nevertheless allows transmission of a sufficiently high drive power.

SUMMARY

In one embodiment of the present disclosure, a drive system for a harvesting header of a harvester includes a drive motor and a drive train, connected between the drive motor and one or more driven elements of the harvesting header, the drive train having a variable-displacement hydraulic pump arranged on board the harvester and a hydraulic motor connected in a closed circuit to the hydraulic pump, which hydraulic motor is mounted on the harvesting header and connected by means of detachable hydraulic couplings to the hydraulic pump.

Because the hydraulic motor is mounted on the harvesting header, there is no need for mechanical drive means for the harvesting header, which would have to be provided between the hydraulic motor and the driven elements of the harvesting header. The detachable hydraulic coupling connections make it possible to disconnect the harvesting header from the harvester if necessary.

The line running from the hydraulic pump to the hydraulic motor can contain a first coupling connection and the line returning from the hydraulic motor to the hydraulic pump can contain a second coupling connection, wherein the first and second coupling connections are each mounted on a respective common bracket on the harvesting header and on the harvester. Thereby the harvesting header can be quickly and easily separated and brought together.

The harvesting header can be furnished with a code that can be read out by the harvester and can be supplied to a control unit that is operable to open a valve arranged between the hydraulic pump and the hydraulic motor if it is recognizable on the basis of information associated with the code that the harvesting header contains a hydraulic motor for driving the harvesting header.

In addition, a hydraulic motor, with which a harvesting header not equipped with a hydraulic motor can be driven, can be present on the harvester.

The control unit can be operable to switch a valve arranged between the hydraulic pump and the hydraulic motor into a position connecting the hydraulic motor on the harvester to the hydraulic pump or to bring the hydraulic motor on the harvester, designed as a variable-displacement motor, into a zero position if the harvesting header is not provided with a code that indicates that the harvesting header is furnished with a hydraulic motor. The code can also contain additional operating data of the harvesting header such as the maximum drive torque or appropriate rotational speeds, which can be read out by the control unit and taken into account.

In another embodiment, the hydraulic motor and the valve on the harvester can also be omitted. Then all harvesting headers to be used with the harvester would have to be equipped with a hydraulic motor.

The coupling connections on the harvester can be disconnected by the valve in the position thereof connecting the hydraulic motor on the harvester to the hydraulic pump.

The harvesting header can be a pick-up having a transverse auger and a tine rotor. The transverse auger can be driven by the hydraulic motor. The hydraulic motor can be arranged inside the transverse auger and/or designed as a radial piston motor. The tine rotor can be driven by a hydrostatic transmission that is drivable by the transverse auger.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
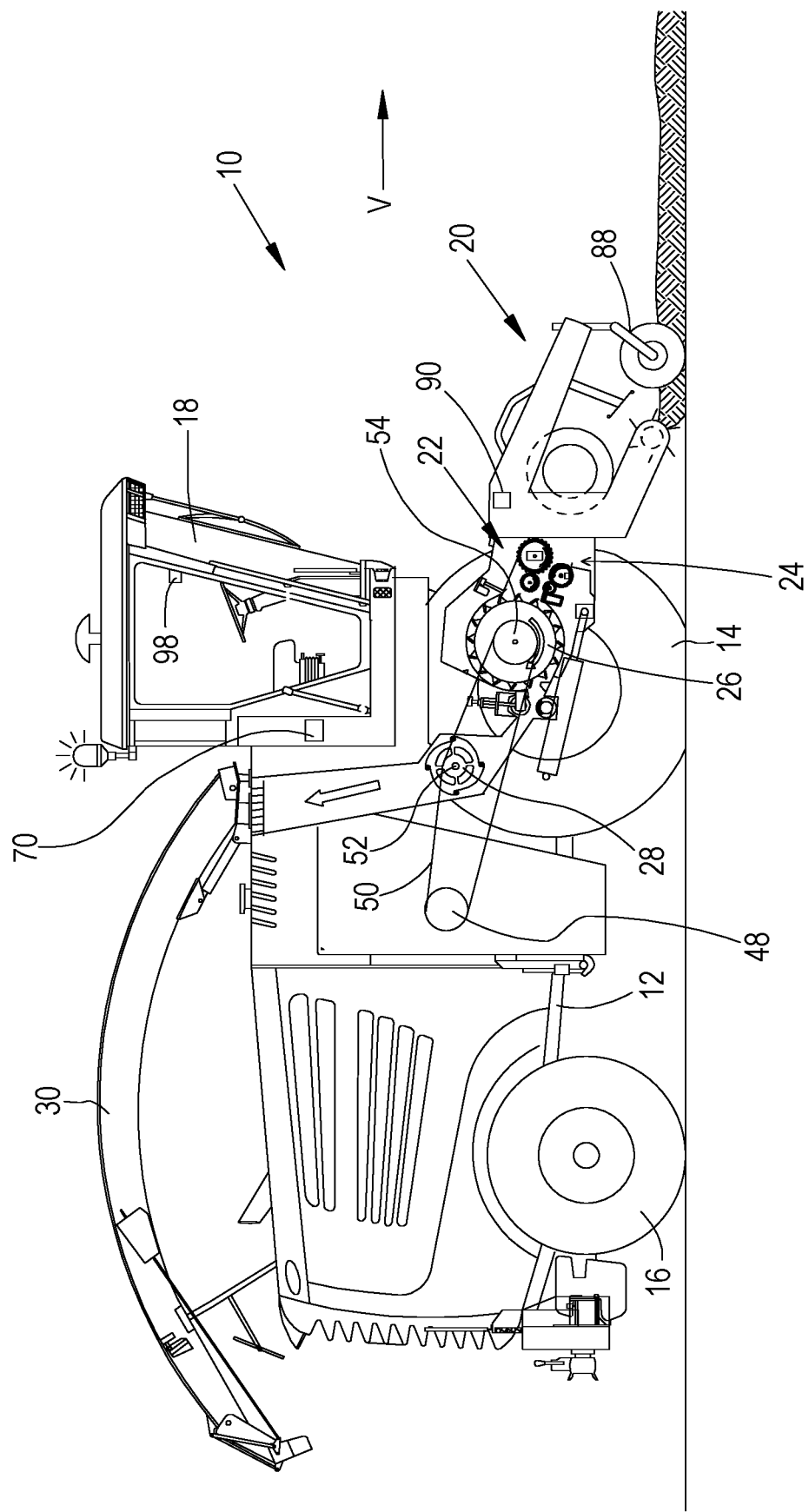
FIG. 1 shows a schematic side view of a self-propelled harvester in the form of a forage harvester.

In FIG. 1, a harvester 10 is provided in the form of a self-propelled forage harvester in a schematic side view. The harvester 10 is constructed on a frame 12 that is supported by driven front wheels 14 and steerable rear wheels 16. The harvester 10 is operated from a driver's cab 18, from which a harvesting header 20 can be seen. In the illustrated embodiment, the harvesting header 20, operationally separable from the harvester 10, is designed as a pick-up and comprises a transverse auger 74, a tine rotor 84 arranged in front of the latter as well as support wheels 88 and a hold-down 92 above the tine rotor 84.

A crop such as grass or the like picked up from the ground by means of the harvesting header 20 is fed, via an intake conveyor 22 having pre-pressing rollers arranged inside an intake housing 24 on the front side of the forage harvester 10, to a chopping unit 26 in the form of a chopping drum arranged underneath the driver's cab 18 that chops the crop into small pieces and transfers it to a conveying unit 28. The material leaves the harvester 10 via a discharge chute 30, rotatable about a vertical axis and having an adjustable inclination, to a transport vehicle traveling alongside. Directional indications such as lateral, below and above refer hereinafter to the forward direction V of the harvester 10, which runs to the right in FIG. 1.

Figure 2:
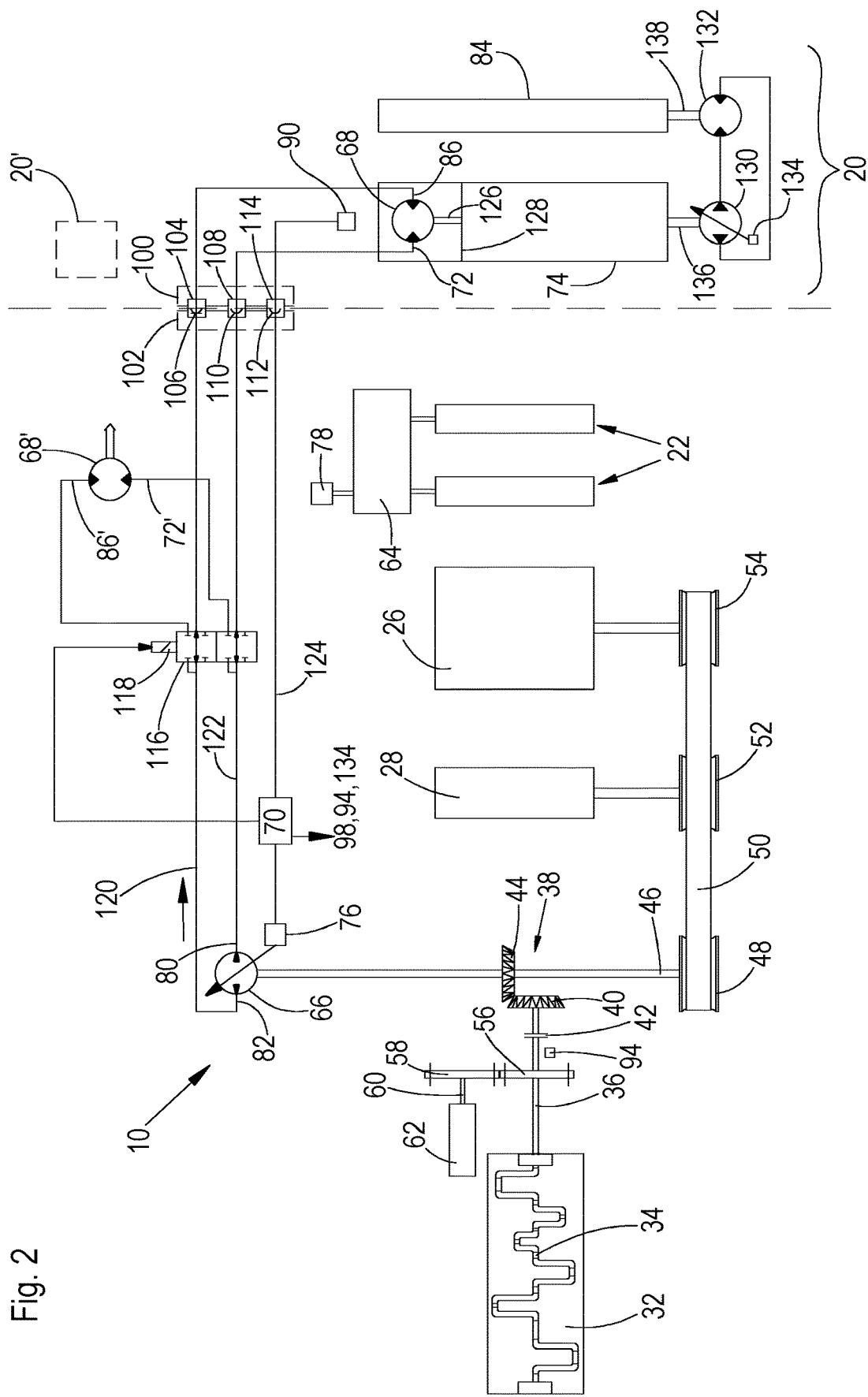
FIG. 2 shows a schematic plan view of the drive system of the harvesting header and the associated hydraulics.

FIG. 2 shows a plan view of the drive arrangements of the harvester 10 and the harvesting header 20. An internal combustion engine serving as a drive engine 32, more particularly in the form of a diesel engine that is supported by longitudinal or transverse beams of the frame 12, is located in the rear region of the harvester 10. The internal combustion engine 32 extends in the forward direction of the harvester 10 approximately up to the rear end of the frame 12 and comprises a crankshaft 34 that extends forward out of the housing of the internal combustion engine 32. The crankshaft 34 drives an output shaft 36 extending horizontally and to the front.

The output shaft 36 is connected at the front end thereof to an angle gearbox 38, which consists of a first bevel gear 40 connected via a clutch 42 to the longitudinal shaft 36, and of a second bevel gear 44 that meshes with the first bevel gear 40. The axis of rotation of the second bevel gear 44 runs horizontally and transverse to the forward direction. The second bevel gear 44 is connected to a shaft 46 that drives a belt pulley 48. The belt pulley 48 is wrapped by a drive belt 50 that also wraps a belt pulley 52 for driving the conveying unit 28 and a belt pulley 54 for driving the chopping unit 26. The angle gearbox 38, the shaft 46, the belt pulleys 48 and 54 and the drive belt 50 form a drive train that connects the output shaft 36 to the chopping unit 26.

Between the clutch 42 and the housing of the internal combustion engine 32, the longitudinal shaft 36 additionally supports a peripherally toothed gear 56, which meshes with a further gear 58 that drives, via a shaft 60, a pump unit 62 used for supplying the hydraulic motors for driving the wheels 14, 16, a hydraulic motor 78 used for driving the intake conveyor 22 via a gearbox 64, and other hydraulically driven components of the harvester 10. Details on a possible driving of the hydraulic motor 78, the pump of which could also be driven by the shaft 46, can be found in DE 10 2013 214 986 A1 and the prior art cited therein.

The shaft 46 in the illustrated embodiment is constantly connected drivingly to a hydraulic pump 66 with adjustable displacement and flow direction. The hydraulic pump 66 is connected so as to conduct hydraulic fluid in a closed circuit to a hydraulic motor 68 that has a fixed displacement and is used for driving the driven elements of the harvesting header 20, which could also be a mowing header for harvesting corn or for producing whole-plant silage. In this case the hydraulic motor 68 (or multiple hydraulic motors 68) could be used for driving mowing devices and conveying means for the crop.

An outlet 82 of the hydraulic pump 66 and an inlet 86 of the hydraulic motor 68 are connected to one another by a first pressure line 120. An inlet 80 of the hydraulic pump 66 and an outlet 72 of the hydraulic motor 68 are connected to one another by a second pressure line 122. The hydraulic motor 68 and the hydraulic pump 66 are operated in a closed circuit, which enables the transmission of sufficiently large pressure and a sufficient flow rate of hydraulic fluid and thus a sufficient drive power for driving the movable elements of the harvesting header 20.

The hydraulic motor 68 is located on board the harvesting header 20. In order to be able to disconnect the pressure lines 120 and 122 during removal of the harvesting header 20, detachable coupling connections are provided in the pressure lines 120, 122, each comprising a header side coupling connection 104, 108 on the harvesting header 20 and a plug 106, 110 on the harvester 10. The plugs 106, 110 are held together in a mounting 102 on the harvester 10. The header side coupling connections 104, 108 are held together in a mounting 100 on the harvesting header 20. The mountings 100, 102 can be designed in particular as so-called multi-couplers (see EP 1 346 625 A1) and make it possible to disconnect or connect both pressure lines 120 and 122 at the same time. An overflow oil line (not shown) can also be guided via the mountings 100, 102.

A memory unit 90, which is connected via a line 124 to a control unit 70, is provided on the harvesting header 20. The line 124 comprises a plug 112 and a coupling 114, which likewise are integrated into the mounting 100 or 102 and are connected or disconnected along with the mountings.

The hydraulic motor 68 is used for driving the transverse auger 74. The hydraulic motor 68 can be designed as a radial piston motor. Such radial piston motors allow rotational speeds that are suitable for driving the transverse auger 74 without interposition of a transmission gearbox. The output shaft 126 of the hydraulic motor 68 is therefore directly connected via a flange 128 to the interior wall of the empty interior of the transverse auger 74. The hydraulic motor 68 is arranged in the illustrated embodiment inside the empty interior of the transverse auger 74, but could also be mounted outside the empty interior. It would therefore also be conceivable to drive the transverse auger 74 by means of an axial piston motor and, if necessary, to provide a gearbox for changing the speed (more particularly stepping it down) between the axial piston motor and the transverse auger 74. The axial piston motor and, if necessary, also the gearbox can be mounted in the empty interior of the transverse auger 74.

The tine rotor 84 is driven via a hydrostatic transmission having a second hydraulic pump 130 and a second hydraulic motor 132 that is arranged on board the harvesting header 20. The driveshaft of the second hydraulic pump 130 is coupled to the transverse auger 74. The output shaft 138 of the second hydraulic motor 132 is coupled to the tine rotor 84. Differently from that which is shown graphically in FIG. 2, the second hydraulic pump 130 or the second hydraulic motor 132 could also be arranged inside the empty interior of the transverse auger 74 or the tine rotor 84. The second hydraulic pump 130 is connected to the second hydraulic motor 132 in a closed circuit. The displacement volume of the second hydraulic pump 130 is adjustable by means of an actuator, which can be connected to the control unit 70 via an additional line (not shown) guided through the mountings 100 and 102 and separable there. The memory unit 90 or the actuator 134 can be connected to the control unit 70, more particularly by a bus system.

The control unit 70 drives an actuator 76 that influences the flow rate and flow direction of the hydraulic pump 66. Finally, the control unit 70 is connected to an actuator 94 that opens and closes the coupling 42 and to an operator input unit 98 arranged in the driver's cab 18.

The operator input unit 98 allows the operator to select a (road) driving mode, in which the coupling 42 is opened and neither the chopping unit 26 nor the intake conveyor 22 is driven, because then the additional hydraulic motor 78 is also not driven. The hydraulic pump 66 and therefore the driven elements (transverse auger 74 and tine rotor 84) of the harvesting header 20 are shut down due to the opened coupling 42. The wheels 14 and optionally also 16 (with all-wheel-drive) are driven via their hydraulic motors and the pump unit 62.

The operator input unit 98 also allows the operator to select a first operating mode (harvesting mode) in which the coupling 42 is closed and the chopping unit 26 and the conveying unit 28 are driven via their drive belts 50. The shaft 46 then also drives the hydraulic pump 66 which, via a first pressure line 120, applies pressure to the hydraulic motor 68, which in turn drives the transverse auger 74 of the harvesting header 20 and the tine rotor 84 via the hydrostatic transmission with the second hydraulic pump 130 and the second hydraulic motor 132. The intake conveyor 22 is then driven by the pump unit 62 via the additional hydraulic motor 78. The actuator 76 is triggered by the control unit 70 in such a manner that a desired intake speed of the harvesting header 20 results, which can be input by the operator input unit 98 or automatically by the controller based on measurement values of sensors that detect the properties of the crop, such as moisture or compressibility, or by data stored in the memory unit 90. The actuator 134 is analogously triggered by the control unit 70 such that the tine rotor 84 is driven at any desired speed.

In the first operating mode, the hydraulic fluid flows from the outlet 82 of the hydraulic pump 66 through the pressure line 120 to the inlet 86 of the hydraulic motor 68, and from the outlet 72 thereof through the second pressure line 122 to the inlet 80 of the hydraulic pump 66. The terms inlet and outlet thus relate to the flow direction of the hydraulic fluid in harvesting mode, which is also represented by the arrow in FIG. 2.

The operator input unit 98 also allows the selection of a second operating mode (a reversing mode), in which the harvesting header 20 is driven in a direction opposite to that in harvesting mode. Then the control unit 70 causes the actuator 76 to put the wobble plate of the hydraulic pump 66 into a position in which the hydraulic pump 66 delivers hydraulic fluid through the second pressure line 122 to the hydraulic motor 68, which then flows back to the hydraulic pump 66 through the first pressure line 120. The second hydraulic pump 130 is then driven in the opposite rotational direction from that of the first operating mode, so that the second hydraulic motor 132 rotates in a direction opposite to the first operating mode and reverses the tine rotor 84.

The control unit 70 is supplied by the electronic memory unit 90 of the harvesting header 20 with information stored there that indicates whether the respective harvesting header 20 coupled to the harvester 10 has a hydraulic motor 68 or not. If the harvesting header 20 has a hydraulic motor 68, as in the illustrated embodiment of the harvesting header 20, the control unit 70, by means of an actuator 118, will place the valve 116 inserted into the pressure lines 120, 122 into a position connecting the hydraulic pump 66 to the hydraulic motor 68, as shown in FIG. 2. Otherwise the control unit 70 will connect the valve 116 in a second position, in which the hydraulic pump 66 is disconnected from the couplings 104, 108 and thus from the hydraulic motor 68. Instead, the hydraulic pump 66 is connected in the second position of the valve 116 to a harvester side hydraulic motor 68', which is located on board the harvester 10 and is used to drive a second harvesting header 20' that is not equipped with a respective hydraulic motor of its own. The harvester side hydraulic motor 68' on the harvester 10 is drivingly connected via conventional mechanical drive means (clutch or articulated shaft) to the second harvesting header 20'.

It should also be noted that the valve 116 can be eliminated if the harvester side hydraulic motor 68' on the harvester is designed as a servomotor and is brought into a zero position by the control unit 70 by means of an associated actuator if a hydraulically driven harvesting header 20 is detected on the basis of the memory unit 90 electrically connected to the control unit 70.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:
1. A drive system for a harvesting header of a harvester, comprising:
  a drive motor, and
  a drive train connected between the drive motor and a driven element of the harvesting header, the drive train having a variable-displacement hydraulic pump arranged on board the harvester and either a harvester-side hydraulic motor or a header-side hydraulic motor connected in a closed circuit to the hydraulic pump;

wherein the harvesting header includes a code readable by a control unit of the harvester, the control unit is operable to open a valve arranged between the hydraulic pump and the header-side hydraulic motor if it is recognizable on the basis of information associated with the code that the harvesting header includes the header-side hydraulic motor mounted on the harvester header and detachably connect by coupling connections to the hydraulic pump for driving the harvesting header; and the control unit is operable to open a valve arranged between the hydraulic pump and the harvester-side hydraulic motor if it is recognizable on the basis of information associated with the code that the harvesting header is not equipped with the header-side hydraulic motor for driving the harvesting header.

2. The drive system according to claim 1, further comprising:
a pressure line running from the hydraulic pump to the header-side hydraulic motor including a first coupling connection, and
a pressure line returning from the header-side hydraulic motor to the hydraulic pump including a second coupling connection, wherein the first and second coupling connections are each mounted on a respective common bracket on the harvesting header and on the harvester.

3. The drive system according to claim 1, wherein the control unit is operable to bring the valve arranged between the hydraulic pump and the header-side hydraulic motor into a position connecting the harvester-side hydraulic motor to the hydraulic pump if the harvesting header is not furnished with a respective code, or to command the harvester-side hydraulic motor designed as a servomotor to assume a zero position if the harvesting header is not furnished with a respective code.

4. The drive system according to claim 3, wherein the coupling connections are disconnected from the hydraulic pump by the valve in the position thereof that connects the harvester-side hydraulic motor to the hydraulic pump.

5. A harvester, comprising:
a harvesting header;
a drive motor;
a drive train connected between the drive motor and a driven element of the harvesting header, the drive train having a variable-displacement hydraulic pump arranged on board the harvester and either a harvester-side hydraulic motor or a header-side hydraulic motor connected in a closed circuit to the hydraulic pump;
wherein the harvesting header includes a code readable by a control unit of the harvester;
wherein the control unit is operable to open a valve arranged between the hydraulic pump and the header-side hydraulic motor if it is recognizable on the basis of information associated with the code that the harvesting header includes the header-side hydraulic motor mounted on the harvester header and detachably connect by coupling connections to the hydraulic pump for driving the harvesting header; and
the control unit is operable to open a valve arranged between the hydraulic pump and the harvester-side hydraulic motor if it is recognizable on the basis of information associated with the code that the harvesting header is not equipped with the header-side hydraulic motor for driving the harvesting header.

6. The harvester according to claim 5, wherein the harvesting header comprises a pick-up having a transverse auger and a tine rotor, and the header-side hydraulic motor is drivingly connected to the transverse auger.

7. The harvester according to claim 6, wherein the header-side hydraulic motor is arranged inside the transverse auger or designed as a radial piston motor.

8. The harvester according to claim 6, wherein the tine rotor is driven via a hydrostatic transmission drivable by the transverse auger.

9. The harvester according to claim 5, further comprising:
a pressure line running from the hydraulic pump to the header-side hydraulic motor including a first coupling connection, and
a pressure line returning from the header-side hydraulic motor to the hydraulic pump including a second coupling connection, wherein the first and second coupling connections are each mounted on a respective common bracket on the harvesting header and on the harvester.

10. The harvester according to claim 5, wherein the control unit is operable to bring the valve arranged between the hydraulic pump and the header-side hydraulic motor into a position connecting the harvester-side hydraulic motor to the hydraulic pump if the harvesting header is not furnished with a respective code, or to command the harvester-side hydraulic motor designed as a servomotor to assume a zero position if the harvesting header is not furnished with a respective code.

11. The harvester according to claim 10, wherein the coupling connections are disconnected from the hydraulic pump by the valve in the position thereof that connects the harvester-side hydraulic motor to the hydraulic pump.

12. A harvester comprising:
a frame;
a harvesting header detachably coupled to the frame;
a variable-displacement hydraulic pump arranged on board the frame, and either a header-side hydraulic motor of the harvesting header or a harvester-side hydraulic motor provided on the frame connected in a closed circuit to the hydraulic pump;
a valve;
a control unit operable to read a code from the harvesting header and open the valve to provide hydraulic fluid to the header-side hydraulic motor on the basis of information associated with the code indicating that the harvesting header includes the header-side hydraulic motor; and
wherein the control unit is operable to open the valve to provide hydraulic fluid to the harvester-side hydraulic motor to drive the harvesting header when the harvesting header is not equipped with the header-side hydraulic motor.

13. The harvester according to claim 12, wherein the control unit is operable to bring the valve arranged between the hydraulic pump and the header-side hydraulic motor into a position connecting the harvester-side hydraulic motor to the hydraulic pump if the second harvesting header is not furnished with a respective code, or to command the harvester-side hydraulic motor designed as a servomotor to assume a zero position if the second harvesting header is not furnished with a respective code.

* * * * *